Jan. 19, 1932.  J. EKLUND  1,841,940
GYPSUM CALCINING FURNACE
Filed April 28, 1928   2 Sheets-Sheet 1

Joel Eklund
INVENTOR.

BY
ATTORNEYS.

Jan. 19, 1932. J. EKLUND 1,841,940
GYPSUM CALCINING FURNACE
Filed April 28, 1928 2 Sheets-Sheet 2
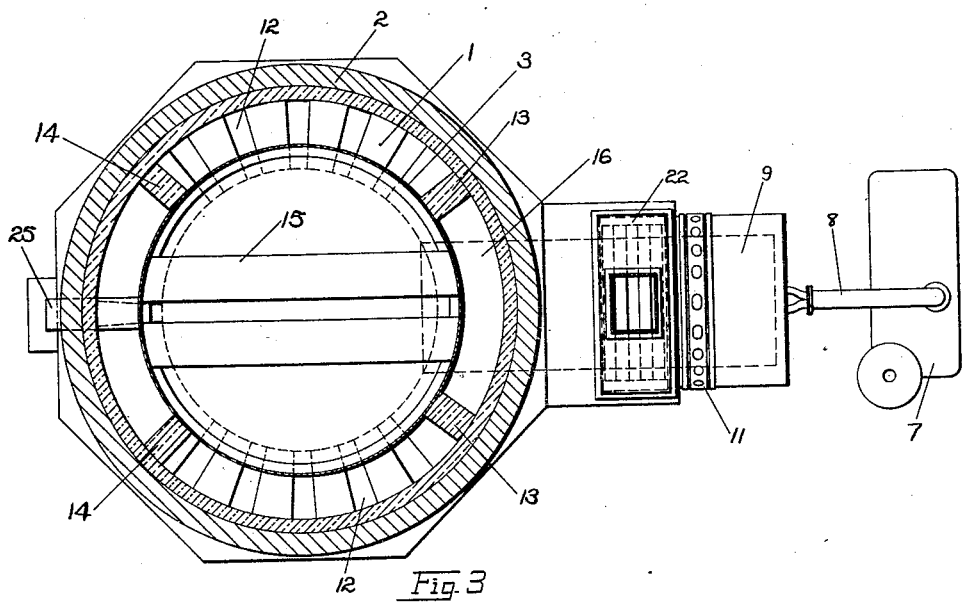
Fig. 3
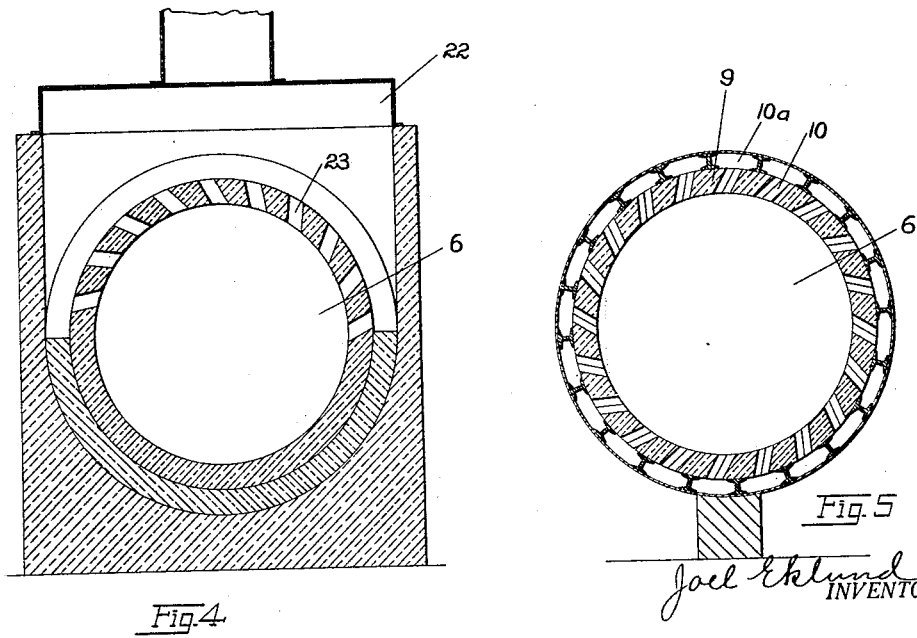
Fig. 4
Fig. 5
Joel Eklund INVENTOR.
BY
ATTORNEYS.

Patented Jan. 19, 1932

1,841,940

UNITED STATES PATENT OFFICE

JOEL EKLUND, OF ERIE, PENNSYLVANIA, ASSIGNOR TO ERIE CITY IRON WORKS, OF ERIE, PENNSYLVANIA, A CORPORATION OF PENNSYLVANIA

GYPSUM CALCINING FURNACE

Application filed April 28, 1928. Serial No. 273,686.

Gypsum calcining furnaces involve a problem of heat control. The gypsum is loaded into kettles and subjected to heat. The material boils at a temperature of from 340° to 380° F., depending on the quality, and then settles down and is usually dumped immediately after the first settling down from the boiling condition, forming first settle plasters. If the material is subjected to a continued heating and its temperature raised from approximately 360° to 420° F., there will be a second cycle of boiling and the material is then dumped immediately after it has settled down from the second boiling. If, however, the operator continues the heating above the second cycle the batch is ordinarily spoiled for the purpose for which it is intended.

The kettles, heated from the furnace beneath them, are subjected to high temperature because the gypsum does not take up the heat from the furnace readily. The bottom of the kettle being subjected to these high furnace temperatures is apt to become so heated as to be reduced in strength and fall into the furnace under the load of material in the kettle. Various efforts have been made to control the furnace temperatures so as to prevent this overheating and destruction of the kettles, this destruction varying so much under the conditions that the kettles have an operating period of a few hours where extreme heats are applied, to several years if properly controlled.

The present invention is designed to control the furnace temperature in an economical and accurate manner so that the destruction of the apparatus may be avoided and the consumption of the fuel may be reduced. The invention is particularly directed to the control of fuel of the pulverulent type, such as powdered fuel. Such fuel, while being ordinarily a desirable fuel for furnace purposes, has been used very little, if at all, for gypsum calcining because of the intense flame and resulting high furnace temperatures; and therefore operators of such furnaces have been very reluctant to use this type of fuel. Features and details of the invention will appear from the specifications and claims.

A preferred embodiment of the invention is illustrated in the accompanying drawings as follows:—

Figure 1:
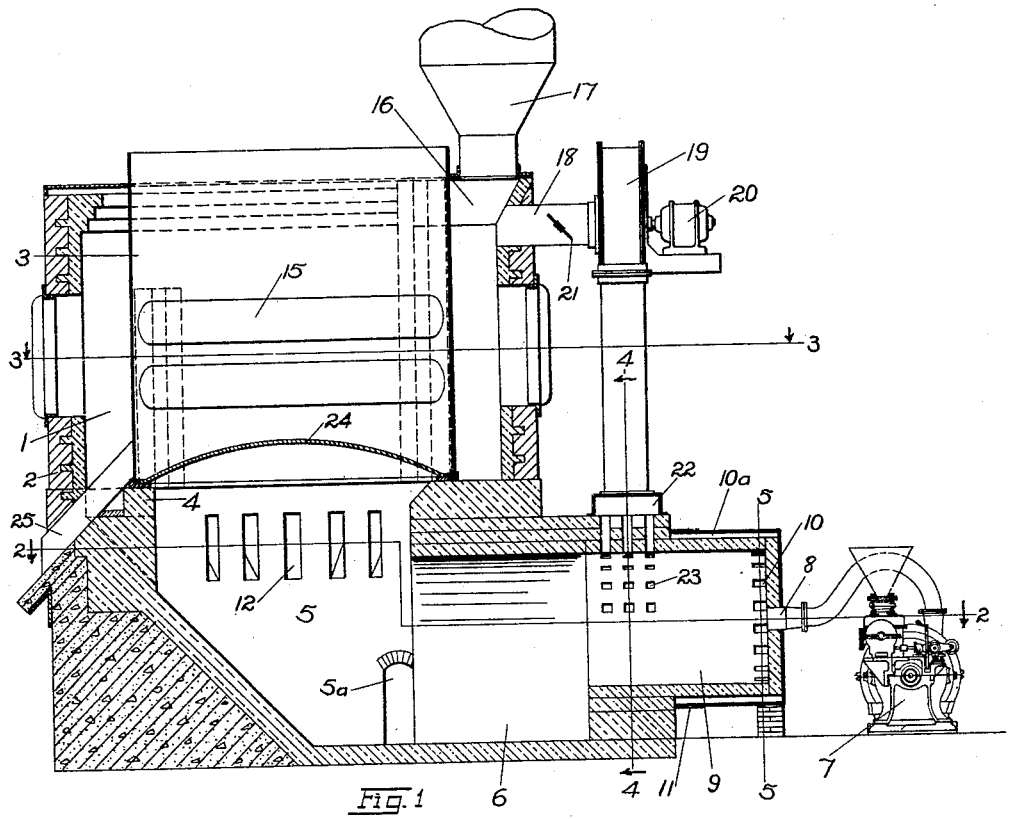
Figure 2:
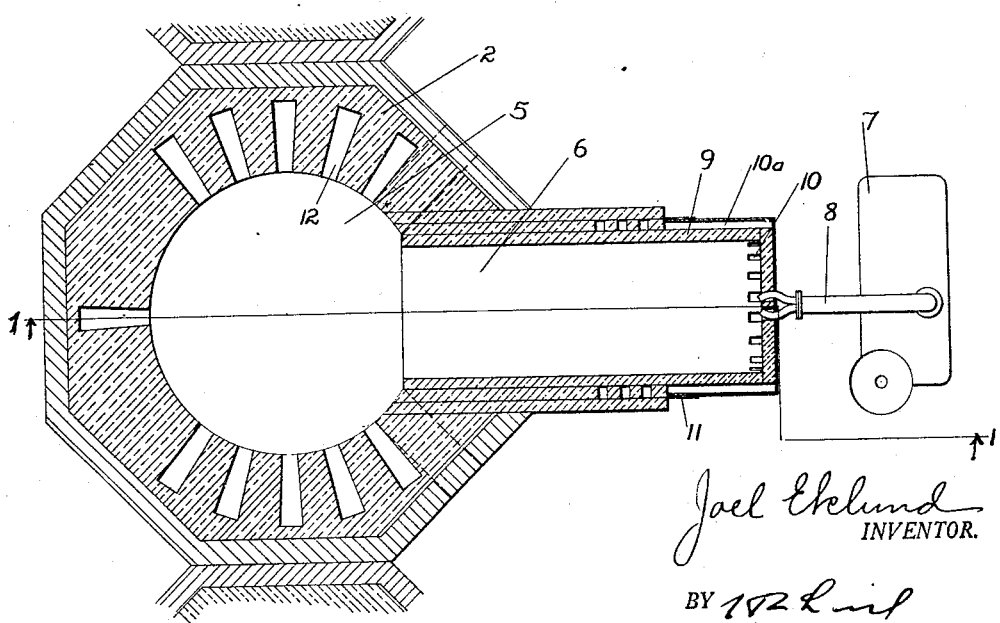

Fig. 1 shows a section through the furnace on the line 1—1 in Fig. 2.
Fig. 2 a section on the line 2—2 in Fig. 1.
Fig. 3 a section on the line 3—3 in Fig. 1.
Fig. 4 a section on the line 4—4 in Fig. 1.
Fig. 5 a section on the line 5—5 in Fig. 1.

1 marks the kettle chamber, 2 the walls enclosing the kettle chamber and furnace, 3 the kettle, 4 the kettle support at the bottom of the kettle chamber, 5 the combustion space below the chamber, 5a the clean-out door, 6 the furnace proper, 7 a pulverizer, 8 a fuel discharge from the pulverizer, 9 a vortex ignition chamber, 10 air inlets leading to the ignition chamber, 10a air passages leading to the inlets 10, and 11 an annular damper controlling the flow of air to the passages 10a.

The combustion chamber is connected by passages 12 with a portion of the kettle chamber between walls 13 and 14. The wall 13 forms a complete closure from top to bottom of the kettle chamber while the wall 14 terminates below the top of this chamber so that the gases pass up the sides of the chamber between the walls 13 and 14 and over the wall 13. Flues 15 extend across the kettle and receive the gases passing over the wall 14 and carry them to the exit flue portion 16 of the kettle chamber, this flue portion being between the walls 13. This flue portion connects with the stack 17.

A bypass 18 leads from the exit flue 16 and discharges to a chamber 22. A fan 19 is arranged in the bypass. A motor 20 drives the fan. The chamber 22 is connected by passages 23 with the vortex ignition chamber 9 at a point away from the inlets of the fuel. A damper 21 is provided for controlling the amount of flue gas which may be returned to the furnace. The kettle bottom 24 is of the arch shape common to calcining kettles and the kettle is dumped through a chute 25 in the usual manner.

With this construction a portion of the hot flue gases are returned to the furnace and thus the burning gases are diluted and their temperature thus controlled. The flue gas is approximately a neutral gas depending on the efficiency of the combustion and by reason of its heat permits of a reduction in the amount of fuel delivered in maintaining the furnace at the temperature desired. At the same time this dilution can be carried to a point to reduce the furnace temperature, thus preventing the intense flame effect incident ordinarily to the burning of pulverulent fuel and making it practical to use such fuel in connection with a gypsum calcining kettle. With this reduction and control of the flame temperature the kettle bottom 24 may be kept at a temperature below the damaging point so that the kettle will last for a long period of time and a very definite saving of fuel may be effected and the control, while very sensitive, is one that may be readily handled by ordinary operators.

It is desirable to introduce the neutral gas at a point away from the introduction of the fuel so that the combustion of the fuel may be well under way prior to the neutralizing effect of the neutral gas so that the combustion may be complete notwithstanding the dilution by the gas.

What is claimed as new is:—

1. In a gypsum calcining furnace, the combination of a kettle; a furnace supplying heat to the kettle, the bottom of the kettle forming the top wall of the furnace; means supplying pulverulent fuel and air to the furnace; a discharge flue leading from the furnace; and a bypass returning flue gases from the flue to the furnace.

2. In a gypsum calcining furnace, the combination of a kettle; a furnace supplying heat to the kettle, the bottom of the kettle forming the top wall of the furnace; means supplying pulverulent fuel and air to the furnace; a discharge flue leading from the furnace; and a bypass returning flue gases from the flue to the furnace, the gases being returned to the combustion space of the furnace in advance of the point of ignition of the fuel.

In testimony whereof I have hereunto set my hand.

JOEL EKLUND.